(12) United States Patent
Wugofski

(10) Patent No.: US 6,507,951 B1
(45) Date of Patent: *Jan. 14, 2003

(54) SYSTEM FOR TIME-SHIFTING EVENTS IN A MULTI-CHANNEL CONVERGENCE SYSTEM

(75) Inventor: Theodore D. Wugofski, Fort Worth, TX (US)

(73) Assignee: Amiga Development LLC, Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/002,580

(22) Filed: Jan. 5, 1998

(51) Int. Cl.⁷ .......................... H04N 5/445; G06F 3/00; G06F 13/00
(52) U.S. Cl. .............................. 725/59; 725/9; 725/38; 725/39; 725/80; 725/133; 348/553; 348/554; 348/555; 348/705; 348/706; 348/570
(58) Field of Search .................. 725/9, 38, 39, 725/47, 48, 59, 80, 133; 348/553, 555, 570, 554, 558, 705, 706

(56) References Cited

U.S. PATENT DOCUMENTS

| | | | | |
|---|---|---|---|---|
| 5,469,431 A | * | 11/1995 | Wendorf et al. | 370/254 |
| 5,686,954 A | * | 11/1997 | Yoshinobu et al. | 725/43 |
| 5,808,702 A | * | 9/1998 | Yoshinobu et al. | 348/731 |
| 5,850,266 A | * | 12/1998 | Gimby | 348/558 |
| 5,883,677 A | * | 3/1999 | Hofmann | 348/584 |
| 5,926,207 A | * | 7/1999 | Vaughan et al. | 725/139 |
| 5,990,883 A | * | 11/1999 | Byrne et al. | 345/721 |
| 6,069,621 A | * | 5/2000 | Schupak | 345/717 |
| 6,133,910 A | * | 10/2000 | Stinebruner | 345/719 |
| 6,208,799 B1 | * | 3/2001 | Marsh et al. | 386/83 |
| 6,229,575 B1 | * | 5/2001 | Vaughan et al. | 348/564 |

FOREIGN PATENT DOCUMENTS

| | | |
|---|---|---|
| EP | 0766474 A | 4/1997 |
| WO | 9637983 A | 11/1996 |
| WO | 9736391 A | 10/1997 |
| WO | 9747136 A | 12/1997 |
| WO | 9749237 A | 12/1997 |
| WO | 9627982 A | 9/1999 |

* cited by examiner

Primary Examiner—Andrew Faile
Assistant Examiner—Jason Salce
(74) Attorney, Agent, or Firm—Rodney Lacy; Mark S. Walker

(57) ABSTRACT

An architecture for convergence systems is disclosed. The architecture includes a hardware component providing a convergence environment. A channel map services component includes a listing of receivers of programming associated with the convergence environment and a listing of channels associated with the receivers. A content services component includes a listing of programming events associated with the channels of the receivers. The content services component also includes a listing of the times of programming events. A TV services component uses the channel map services component, and the content services component to control the hardware component of the convergence environment to manage the hardware component of the convergence environment. The TV services component controls the audio/video multiplexer to reroute programing signals from receivers to outputs of the audio/video multiplexer and various devices attached to the outputs, at various times. When a conflict resolution requires time-shifting of one of the programming events, the TV services component may inform the user and seek input regarding the time-shift solution. Conflicts are resolved with minimal user intervention.

17 Claims, 8 Drawing Sheets

FIG. 5

| | |
|---|---|
| CHANNEL NUMBER | 1 |
| DEVICE ID | D1 |
| PHYSICAL CHANNEL | 4 |
| CHANNEL NAME | FOX |

550

510 — CHANNEL NUMBER
512 — DEVICE ID
514 — PHYSICAL CHANNEL
516 — CHANNEL NAME

| | |
|---|---|
| CHANNEL NUMBER | 2 |
| DEVICE ID | D2 |
| PHYSICAL CHANNEL | 4 |
| CHANNEL NAME | FOX |

551

204

| | |
|---|---|
| CHANNEL NUMBER | 3 |
| DEVICE ID | D4 |
| PHYSICAL CHANNEL | 4 |
| CHANNEL NAME | FOX |

552

| | |
|---|---|
| CHANNEL NUMBER | 4 |
| DEVICE ID | D1 |
| PHYSICAL CHANNEL | 5 |
| CHANNEL NAME | NBC |

553

| | |
|---|---|
| CHANNEL NUMBER | 5 |
| DEVICE ID | D2 |
| PHYSICAL CHANNEL | 5 |
| CHANNEL NAME | NBC |

554

| | |
|---|---|
| CHANNEL NUMBER | 6 |
| DEVICE ID | D4 |
| PHYSICAL CHANNEL | 5 |
| CHANNEL NAME | NBC |

555

. . .

| | |
|---|---|
| CHANNEL NUMBER | 356 |
| DEVICE ID | D3 |
| PHYSICAL CHANNEL | 221 |
| CHANNEL NAME | NBC |

556

| | |
|---|---|
| CHANNEL NUMBER | 357 |
| DEVICE ID | D3 |
| PHYSICAL CHANNEL | 222 |
| CHANNEL NAME | NBCW |

557

| | |
|---|---|
| CHANNEL NUMBER | 358 |
| DEVICE ID | D3 |
| PHYSICAL CHANNEL | 223 |
| CHANNEL NAME | FOX |

558

SYSTEM FOR TIME-SHIFTING EVENTS IN A MULTI-CHANNEL CONVERGENCE SYSTEM

RELATED APPLICATIONS

This application is related to the co-assigned and co-filed applications,

Ser. No. 09/002,593, filed Jan. 5, 1998, "Method and system for associating web sites to television programs;"

Ser. No. 09/002,762, filed Jan. 5, 1998 (U.S. Pat. No. 6,003,041, issued Dec. 14, 1999), "Method for managing multiple channel maps from multiple input devices in a multimedia system;"

Ser. No. 09/002,990, filed Jan. 5, 1998, "Individualized parameter control for multiple media sources in a data processing system;"

Ser. No. 09/002,972, filed Jan. 5, 1998, "System for combining electronic program guide data;"

Ser. No. 09/002,584, filed Jan. 5, 1998, "System for scheduled caching of in-band data services;"

Ser. No. 09/002,944, filed Jan. 5, 1998, "Integration of internet sources into an electronic program database list;"

Ser. No. 09/002,586, filed Jan. 5, 1998 (abandoned), "Previous, favorite, and frequent channel management system[,];"

Ser. No. 09/002,761, filed Jan. 5, 1998, "System, apparatus and method for tuning a television to a selected channel;"

Ser. No. 09/002,596, filed Jan. 5, 1998, "System for resolving channel selection in a multi-channel convergence system;" and Ser. No. 09/002,906, filed Jan. 5, 1998, "A system for managing favorite channels.".

FIELD OF THE INVENTION

The present invention relates generally to convergence systems and more particularly to a system and an architecture for channel selection and time-shifting events in a convergent system.

BACKGROUND OF THE INVENTION

A convergence system refers to a system that includes capabilities that otherwise are provided by separate systems. For example, the Gateway Destination PC/TV system, available from Gateway 2000, Inc., provides for both computer and television capability. Rather than forcing users to have both a separate television and a separate computer, convergence systems such as the Destination PC/TV system permit users to utilize both television and computer capability within the same system.

Convergence systems are believed by many in the industry to represent the future of consumer electronics. Rather than having a computer in a den, and other, separate devices scattered in other rooms throughout their homes, consumers may opt for a convergence system integrating the functionality of both the computer and these separate devices. For example, convergence systems such as the Destination PC/TV system permit consumers to combine computer capability with the capability of such varying devices as digital video disc (DVD) players, direct broadcast satellite (DBS) receivers, TV tuners (for broadcast and/or cable TV), CD-ROM players, audio/video tuners having at least radio tuning capability, cable decoders, video cassette recorders, laser and compact disc players, video cameras, etc.

Currently, a user may have a number of TV programming sources, such as antennas, satellite receivers, cable, modem, etc., attached to the inputs of an audio/video tuner. Also attached to the outputs of the audio/video tuner are a number of devices, such as one or more displays and VCRs. Currently, in order to watch one TV program and record another, the user must remember what TV programming sources are attached to which of the output devices through the audio/video tuner. The audio/video tuner includes a multiplexer, however, the multiplexers do not manage the resources attached to the audio/video tuner. The user must manage the resources. The user must remember which devices are attached to the various inputs and outputs, and what channels or programming inputs are available on the different programming sources. The user must keep this in mind when resolving conflicts. For example, if the user wants to view a football game and record a tennis match, the user must find a programming source or input for the football game, a programming source or input for the tennis match and then must select which source to watch and which source to input to a VCR for recording. The user must also resolve conflicts in the programming. For example, the user may prefer to watch the football game from cable since the source is generally more clear than broadcast television from an antennae. If both the football game and the tennis match are both available on cable and on broadcast TV, the user must decide whether to watch the football game from the cable source or from the antennae (broadcast TV source). Sometimes users can resolve conflicts in resources by recording delayed broadcasts or rebroadcasts of a program. Users must find the rebroadcast or delayed broadcast and program an available VCR to record the later occurring program. Such a system requires users to find the alternate programs, assure that there are no other conflicts, and set the device output to record at a later time. Users are prone to making mistakes and may record the wrong program.

There is a need for a system for resolving conflicts that emerge when using convergence systems, such as the Destination PC/TV system. There is a need for a system that considers time-shifting as a possible solution and which can shift a start and stop time to a different receiver input. There is also a need for a system that uses the PC to record preferences and manage the resources (the input and output connections and the devices) autonomously. This makes the convergence systems much more user friendly and truly useful for the users. In addition, the human intervention is eliminated and this cuts down on the mistakes that many users may make when recording programming.

SUMMARY OF THE INVENTION

The above-identified shortcomings as well as other problems are addressed by the present invention, which will be understood by reading and studying the following specification. The invention describes a system for selecting channels in a multi-channel convergence system. The system resolves channel conflicts that emerge when using a convergence systems, such as the Destination PC/TV system. The system that uses several databases in a PC to record preferences and manage the resources (the input and output connections and the devices) autonomously with a minimal amount of intervention from the user.

The architecture includes a hardware component providing a convergence environment. A channel map services component includes a listing of receivers of programming associated with the convergence environment and a listing of channels associated with the receivers. A content services component includes a listing of programming associated with the channels of the receivers. A TV services component uses the channel map services component, and the content services component to control the hardware component of the convergence environment to manage the hardware component of the convergence environment. The TV services component controls the audio/video multiplexer to reroute programming signals to from receivers to outputs, audio/video multiplexer and various devices attached to the outputs. Conflicts are resolved with minimal user intervention. The TV services component manages the resources autonomously and provides a user friendly convergence environment.

Conflicts can also be resolved by time-shifting the use of an output device to a time when a desired program or event is available. The content services component is searched by the TV services component to locate an alternative source of programming. The TV services component also assures that the input source of programming is available at the delayed-time. If available, the user is informed of the conflict and the potential solution which requires time-shifting to another time. If the user indicates that a time-shifting solution is appropriate, the TV services stores the new start time, the source of programming, the specific channel associated with the source where the selected program or event will occur, and the output to which the device is attached. A universal program identifier can be substituted for the start and stop times. With a universal program or event identifier, the start of the actual program or event will begin the input of the program signal to a designated input and to a designated output where a device is attached.

In different embodiments of the invention, computers, computerized systems, and software architecture of varying scope are described. Still other and further embodiments, aspects and advantages of the invention will become apparent by reference to the drawings and by reading the following detailed description.

BRIEF DESCRIPTIONS OF THE DRAWINGS

FIG. 5 is a diagram of a channel map database associated with the channel map services component of the invention.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
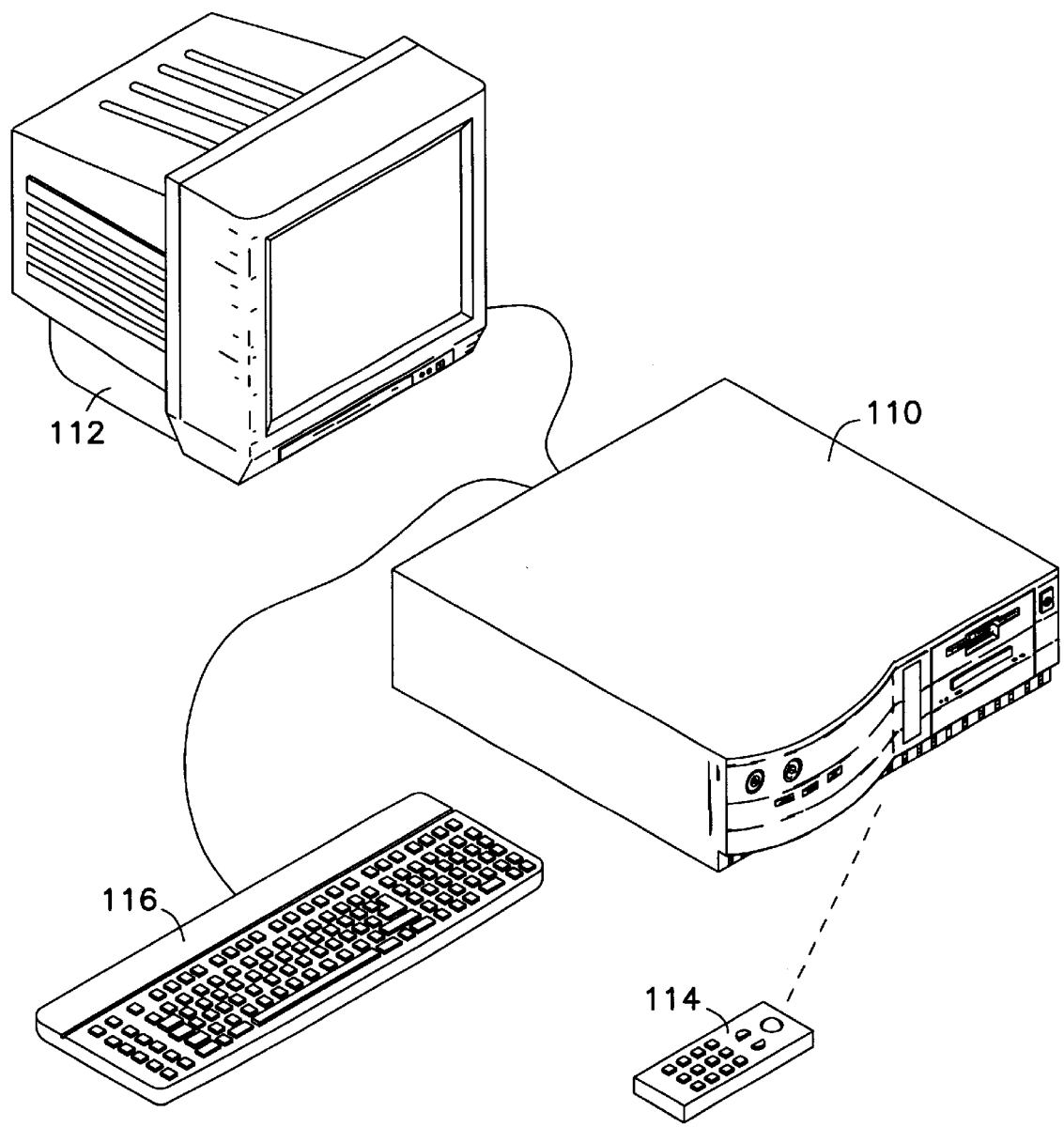
FIG. 1 is a diagram of a typical computer in conjunction with which embodiments of the invention may be implemented.

Referring first to FIG. 1, a diagram of a typical computer in conjunction with which embodiments of the invention may be implemented is shown. Computer 110 is operatively coupled to monitor 112, pointing device 114, and keyboard 116. The computerized system provides the hardware component and the software architecture as has been described herein and as described in related co-pending application entitled ARCHITECTURE FOR CONVERGENCE SYSTEMS, assigned to the same assignee and filed on a date even herewith. Computer 110 includes a processor (preferably, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 110. Computer 110 preferably is a PC-compatible computer running a version of the Microsoft Windows operating system. The construction and operation of such computers are well known within the art.

Computer 110 includes integrated therein or coupled thereto hardware to provide for what is known in the art as a "convergence environment" such that computer 110 provides capability beyond ordinary PC operation. Such capability preferably including TV capability. For example, the Gateway Destination PC/TV system, available from Gateway 2000, Inc., provides a convergence environment across two primary modes of operation: TV viewing, and PC operation. Computer 110 desirably provides for integration with or includes audio/video (i.e., multimedia) devices, including but not limited to, a sound card, a digital video disc (DVD) player, a direct broadcast satellite (DBS) receiver, a TV tuner (for broadcast and/or cable TV), audio/video inputs for external or auxiliary devices, a CD-ROM player, an audio/video tuner having at least radio tuning capability, a cable decoder, a videocassette recorder, a laser disc player, a compact disc player, a DBS integrated receiver-decoder (IRD), and a video camera.

Computer 110 may also be communicatively connected to the Internet, which is not shown in FIG. 1. Internet connectivity of computers is well known within the art. In one embodiment, the computer includes a modem and corresponding communication drivers to connect to the Internet via what is known in the art as a "dial-up connection." In another embodiment, the computer includes an Ethernet or similar hardware card to connect to a local-area network (LAN) that itself is connected to the Internet via what is known in the art as a "direct connection" (e.g., T1 line, etc.).

Monitor 112 permits the display of information, including computer, video and other information, for viewing by a user of the computer. The invention is not limited to any particular monitor 112. Such monitors include cathode ray tube (CRT) displays, as well as flat panel displays such as liquid crystal displays (LCD's). The monitor is, however, desirably a 31" VGA monitor. Pointing device 114 permits the control of the screen pointer provided by the graphical user interface of operating systems such as versions of Microsoft Windows. The invention is not limited to any particular pointing device 114. Such pointing devices include mouses, touch pads, trackballs, remote controls and point sticks. Finally, keyboard 116 permits entry of textual information into computer 110, as known within the art, and the invention is not limited to any particular type of keyboard. Desirably, keyboard 116 is a wireless keyboard.

Figure 2:
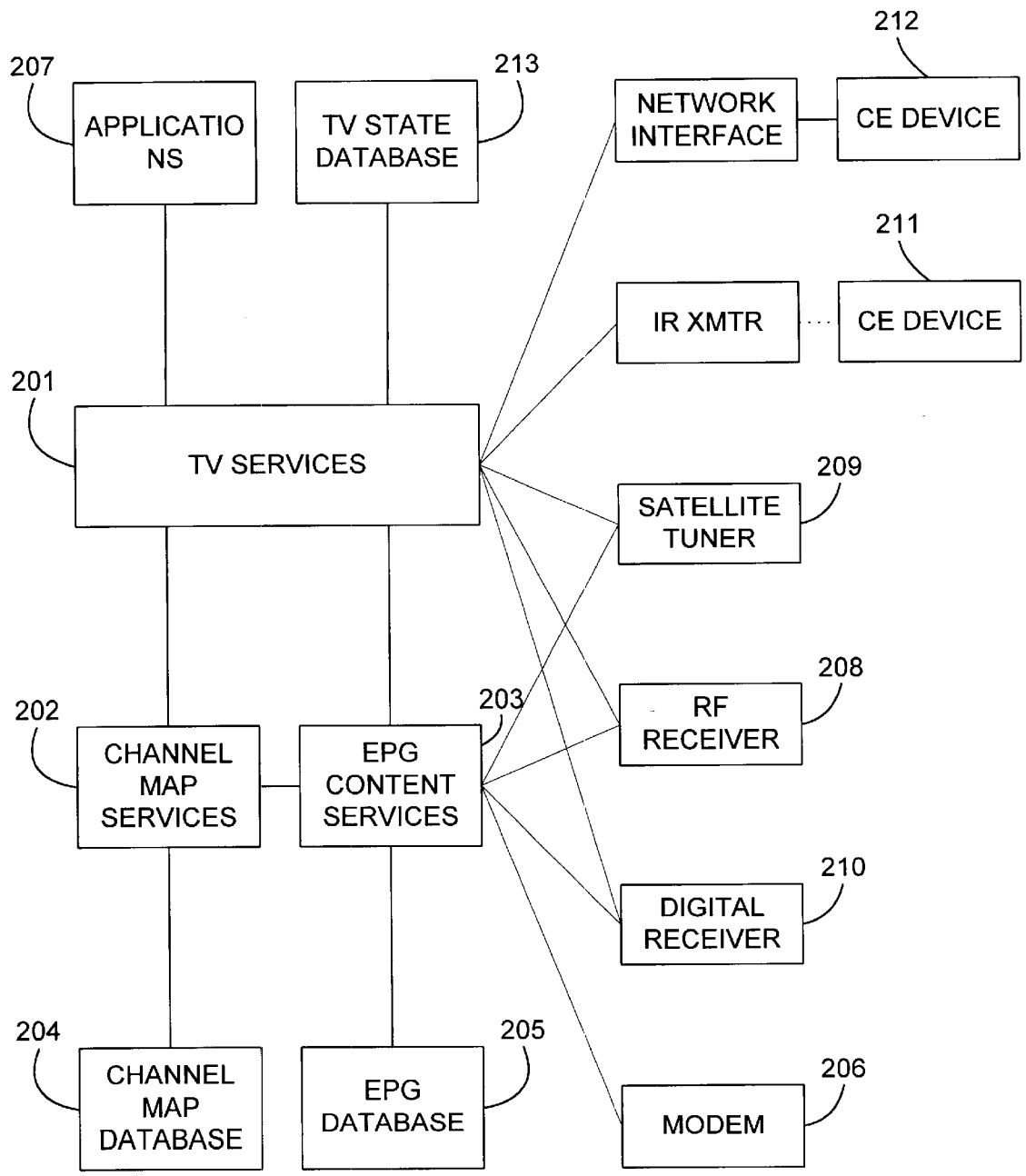
FIG. 2 is a diagram of a system architecture for the system for resolving channel selection in a multi-channel system.

FIG. 2 shows a diagram of system architecture for the system for resolving channel selection in a multi-channel system. One such architecture amenable to the invention is described in the co-pending, co-filed and co-assigned application entitled "Architecture for Convergence Systems," which is hereby incorporated by reference. The system architecture includes three components; namely, a TV services component 201, a channel map services component 202 and an electronic program guide ("EPG") content services component 203. The TV services component 201 is communicatively coupled to the channel map services component 202 and the EPG content services component 203. Communicatively coupled to the channel map services component 202 is a channel map database 204. The channel map database 204 includes a listing of the receivers of programming signals available to the convergence system, the channels available on those receivers and the call letters of the source of the channels. The channel map database 204 will be discussed in more detail with respect to FIG. 5. Communicatively coupled to EPG component 203 is an EPG database 205. The EPG database 205 is a listing of programs or events and channels. The EPG database 205 is retrieved from either an in-band program guides (such as StarSight, DirecTV DSS and Echostar DBS) or out-of-band program guides (such as Electronic TV Host and Intel SmartTV) accessed through a modem 206. Most electronic program guides use only a single source for their program guide data. StarSight uses the vertical blanking interval to access program guide data. DSS and Echostar use the system information in the MPEG II digital satellite stream to access the program guide data. TV Host and Intel SmartTV use a dial-up and file download to access the electronic program guide data. The TV services component 201 selects the various input devices and tunes the channels on these input devices or receivers. These input devices or receivers may be internal or external to the convergence system and may include an RF receiver 208, a satellite receiver 209, a digital receiver 210 and consumer electronics devices, 211, 212 such as VCRs, DVDs, etc. The TV services component 201 may control these receivers with an infrared transmitter link or some other network interface such as defined by IEEE standard number 1394. A TV state database 213 is also communicatively coupled with the TV services component 201.

Figure 3:
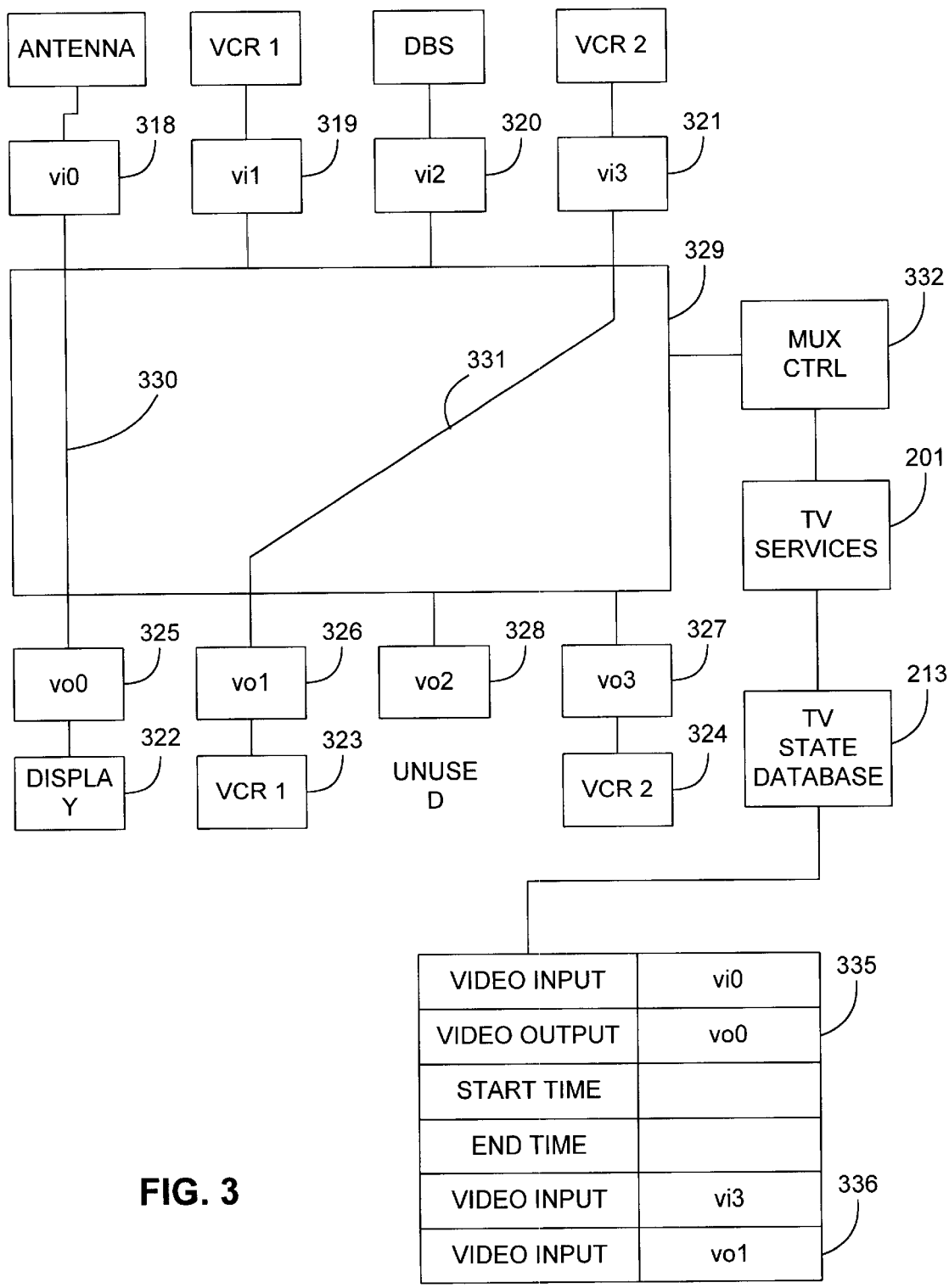
FIG. 3 is a diagram of a typical hardware configuration and shows the TV services portion communicatively coupled to the MUX controller of an audio/video multiplexer.

Now turning to FIG. 3, it can be seen that the TV services component 201 controls the convergence system audio/video multiplexer 329 through a multiplexer controller 332. The system audio/video multiplexer 329 is a switch which controls the switching between various inputs and various outputs within the convergence system. As shown in FIG. 3, there are video inputs vi0 denoted by reference numeral 318, video input vi1 denoted by reference numeral 319, video input vi2 denoted by reference numeral 320, and video input vi3 denoted by reference numeral 321. The various video inputs 318, 319, 320 and 321 are connected to various receivers of programming signals or sources of programming, such as antenna, VCR and DBS as shown in FIG. 3. It should be noted that the various video inputs 318, 319, 320 and 321 can be associated with any of the receivers or sources of programming shown. In other words, a particular video input does not necessarily have to be associated with the source of programming or the receiver shown in FIG. 3. Each video input 318, 319, 320 and 321 can be attached to any of the receivers shown.

The system audio/video multiplexer 329 also has various outputs. As shown in FIG. 3, there is an output video out or vo0, denoted by the reference numeral 325, which is a TV output for a display monitor 322. There is also a video output vo1 denoted by reference numeral 326, a video output vo2 denoted by reference numeral 328, and a video output vo3 denoted by reference numeral 327. The various inputs and outputs may be internal or may be accessed through a jack on the convergence system. Attached or communicatively coupled to video output vo1 is a VCR 323 and attached to video output vo3 is a second VCR 324. It should be noted that vo2 is not used. In other words, there may not be a consumer electronics device or display attached to that particular output. Further, it should be noted that other types of consumer electronic devices or displays may be attached to any of the outputs 325, 326, 327 or 328.

The TV state database 213 includes entries or information regarding the connections between the video inputs 318, 319, 320 and 321 and the video outputs 325, 326, 327 and 328. As shown in FIG. 3, video input 318 or vi0 is attached or electrically connected to video output 325, also known as vo0. The connection path between vi0 and vo0 is denoted by reference numeral 330. Similarly, video input (vi3) 321 is connected to video output (vo1) 326 via a connection path 331. These connections are shown as being part of the TV state database 213 by an entry 335 and an entry 336. Entry 335 corresponds to the connection path 330 through the system audio/video multiplexer 329. The entry 335 indicates that vi0 is the video input and that the video output for that connection is vo0. The entry 335 also indicates the start time and the end time for the connection path 330 through the system audio/video multiplexer 329. The start time and end time may also have date designators within the specific entry. It there is no specific end time, the end time can be designated by a time that does not exist, such as 9999. Entry 336 in the TV state database 213 indicates that the video input vi3 is connected to the video output vo1. This corresponds to the connection path 331 through the system audio/video multiplexer 329. The entry 336 also indicates the start time and the end time for the connection path 331 through the system audio/video multiplexer 329. The start time and end time may also have date designators within the specific entry. Of course, when additional connections are made through the system audio/video multiplexer 329, there are additional entries made in the TV state database 213 which indicate a connection between a particular video input and a particular video output. The TV state database tracks these connections.

Figure 4:
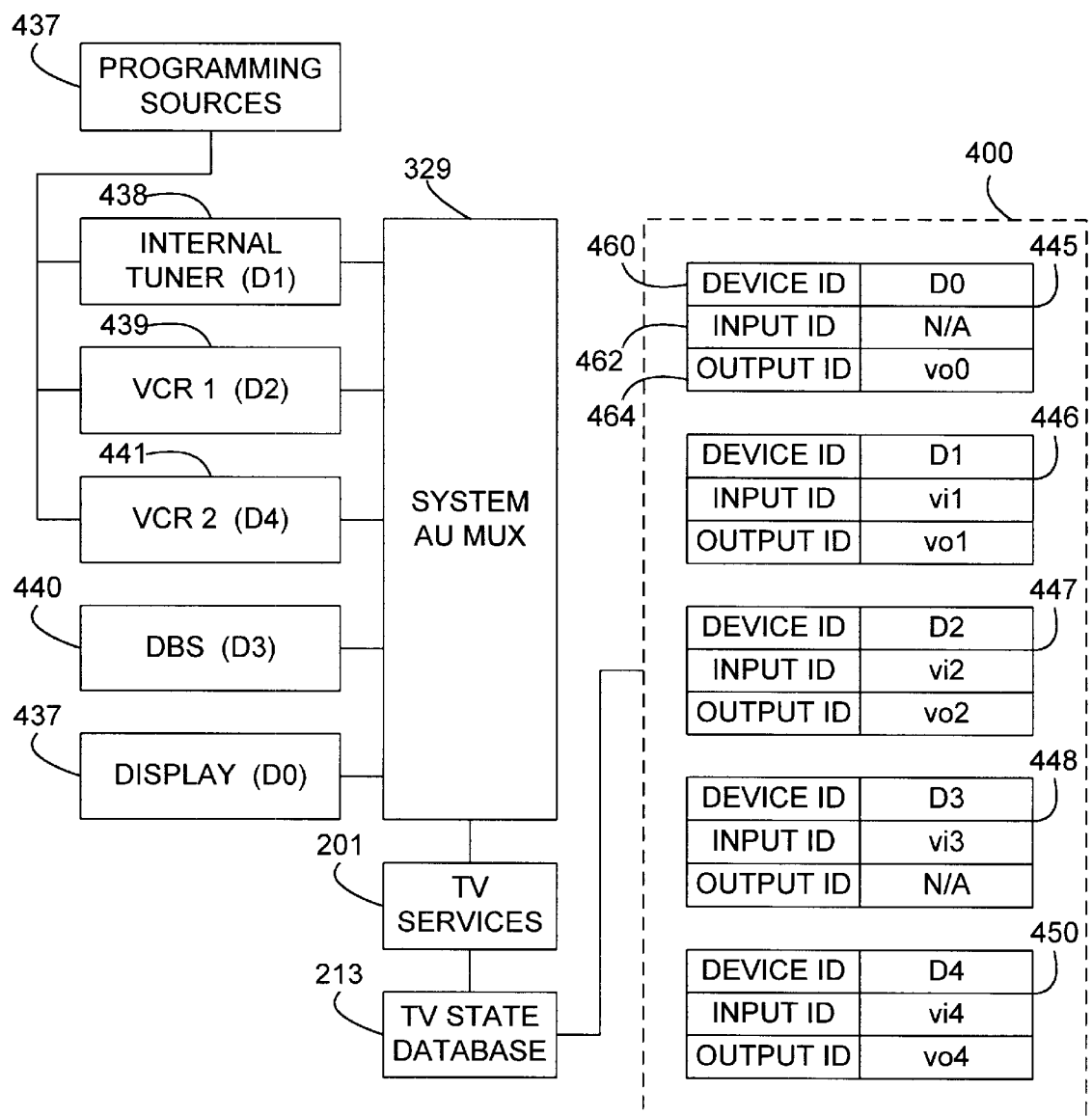
FIG. 4 is a diagram showing a portion of the TV state database associated with the TV services.

FIG. 4 is a diagram showing another portion 400 of the TV state database 213 associated with the TV services component 201. The portion 400 of the TV state database 213 maps the hardware configuration of the convergence system's inputs and outputs. In the configuration shown in FIG. 4, a box represents the various sources of programming events. The sources can be cable, over-the-air broadcasts from one or more local antennas or from a satellite dish, or from any other source. Various devices, including programming or event signal tuner receivers and displays are attached to the system audio/video multiplexer 329. In the example shown in FIG. 4, a display monitor 437, a tuner 438, a first VCR and its tuner 439, a digital satellite set-top box 440, and a second VCR and its tuner 441 are attached to the system audio/video multiplexer 329. The portion 400 of the TV state database 213 provides entries 445, 446, 447, and 448 that map the configuration shown. Each device is given a device ID 460. The inputs from each device are provided with an input ID 462 and the outputs from each device are provided with an output ID 464. However, some devices do not have inputs and some do not have outputs.

For example, the monitor 437, designated by the entry 445, does not include an input ID 462 since the display monitor has no input. That is to say, the audio/video multiplexer 329 only outputs a signal to the display monitor 437. Further entry 448 relates the inputs and outputs of the digital satellite set-top-box 440. The digital satellite set-top-box 440 is not an output device since it only inputs a signal or signals to the audio/video multiplexer 329. Consequently, entry 448 has no output ID 464. The internal TV tuner 438, the first VCR 439 and the second VCR 441 are all attached to the source. The VCRs, 439 and 441, each have an internal tuner as well. Each of these devices has an input ID 462 and an output ID 464. Consequently, each of the entries 446 (related to the internal TV tuner 438), 447 (related to the first VCR 439), and 450 (related to the second VCR 441) has an input and an output with a unique identifier.

FIG. 5 illustrates various entries within the channel map database 204 associated with the channel map services 202. The channel map database 204 includes entries for each device or receiver associated with the convergence system. Each device or receiver has a number of channels associated with that device. The sum total of channels available on the various devices are given a logical channel number 510. Associated with each logical channel number 510 is a device or receiver ID 512, the physical channel 514 associated with the particular device or receiver 512, and the channel name 516. The channel name is the source of television programming. For example, the channel name might be one of the major networks, such as ABC, CBS, NBC or Fox, or any of the other programming sources such as TNT, WNBC, MTV, and any other source of programming that might be available. In FIG. 5, the entries are listed for four devices or receivers, denoted by device IDs 512, D1, D2, D3 and D4. The devices can be any type of receiver of programming signals. As shown in FIG. 5, there are a plurality of entries 550–558 in the channel map database 204 comprising 358 logical channels. The logical channel number 510 for each of the entries is unique to the particular entry. For example, on entry 550, the logical channel number 510 is 1; for the entry 551, the logical channel number 510 is 2; for entry 555, the logical channel number 510 is 6; and for entry 556, the logical channel number 510 is 356, etc. The final entry 358 has a logical channel number 358. The three dots between entries 555 and 556 include the entries for logical channel number 7 through logical channel number 355. It should be noted that there are duplicate channels available for the same source of programming. For example, entry 551 and entry 552 both have the physical channel 514 as channel number 4 and the channel name 516 or source of programming is Fox. In real terms, this means that channel 4 on the Fox network is available on device or receiver D2 as well as device or receiver D4. Therefore, Fox channel 4 is available on both the devices D2 and D4. Even so, each one is given a different logical channel number to uniquely identify that particular channel. Thus, within the database, there are duplicates of a particular physical channel on a particular network or source of programming. It should also be noted, such as at entry 557, that logical channel number 357 carries a West Coast version of physical channel 222 from NBC. In other words, the channel 222 is a delayed broadcast of a previously broadcast East Coast version.

Figure 6:
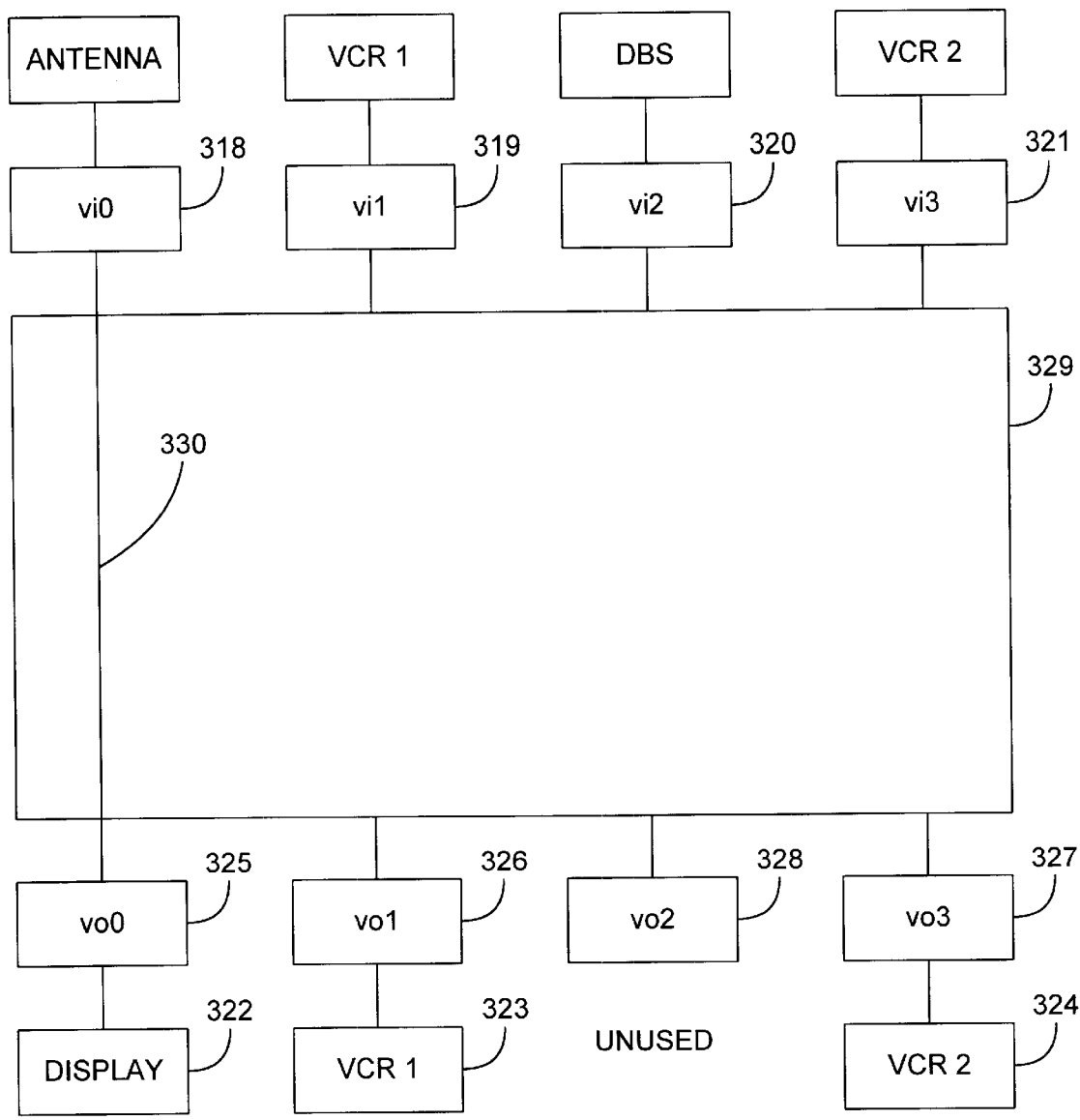
FIG. 6 is a diagram of a first connection through an audio/video multiplexer.

Now turning to FIGS. 6, 7 and 8, the operation of the system will be discussed. When the user attempts to change channels or select devices or receivers that conflict with the representation of the system audio/video multiplexer 329, the TV services component 201 attempts to find a connection path that obeys the interruption setting stored in the TV state database 213. As shown in FIG. 6, the user is watching an off-air television program from an antenna receiver which passes through video input vi0 318, and connected to video output vo0 325. The video output 325 is attached to the display monitor 322. The connection 330 is the same as that shown in FIG. 3 and which is shown as entry 335 in the TV state database 213.

Figure 7:
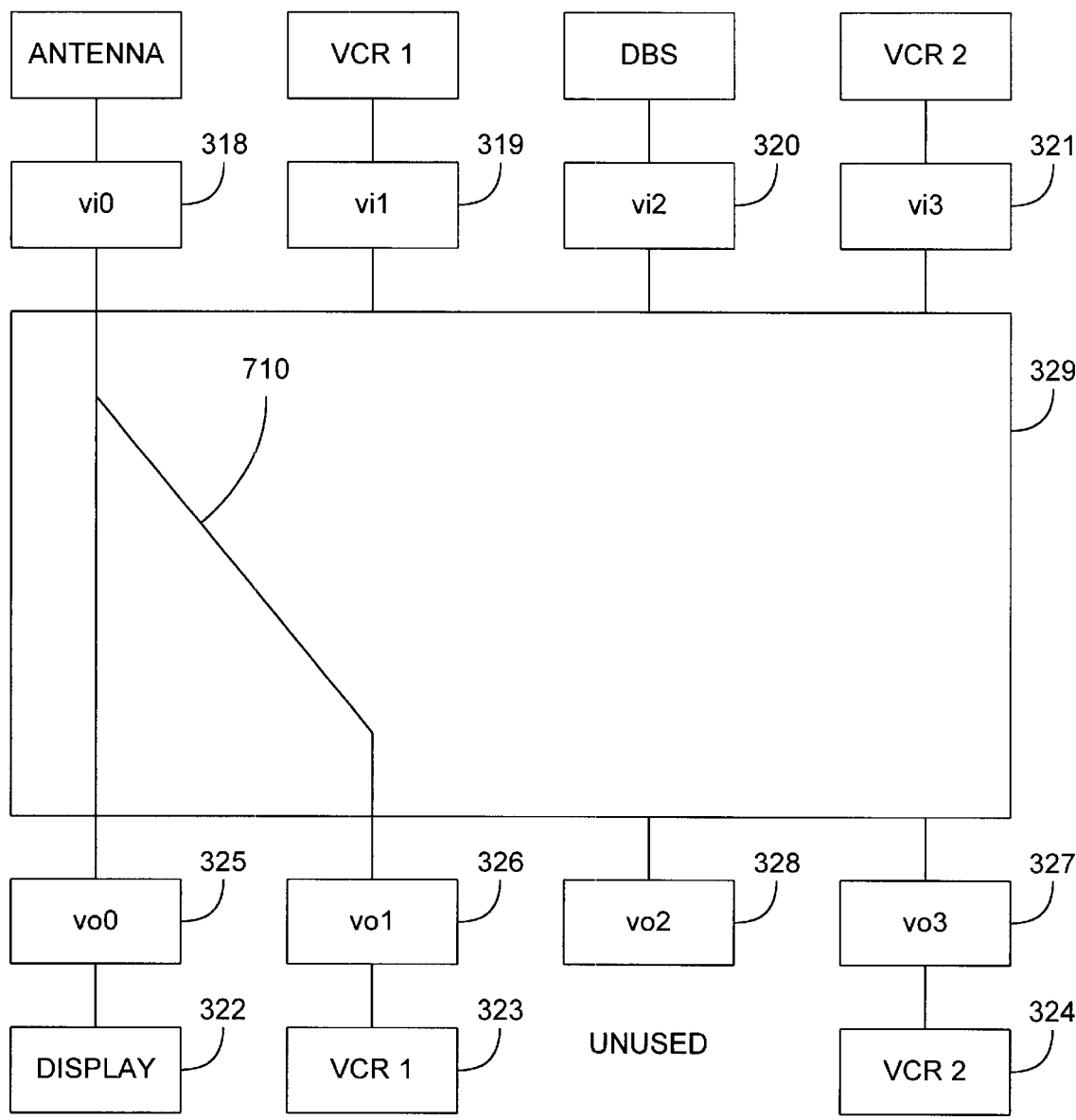
FIG. 7 is a diagram of a first connection and second connection through an audio/video multiplexer.

Now turning to FIG. 7, the user selects to record the current program that the user is watching and, therefore, a new connection path 710 is formed where video input vi0, 318, is connected to video output vo1 326 and in turn to VCR1, 323. Up until this point, there is no conflict since each of the connections can be accommodated.

Figure 8:
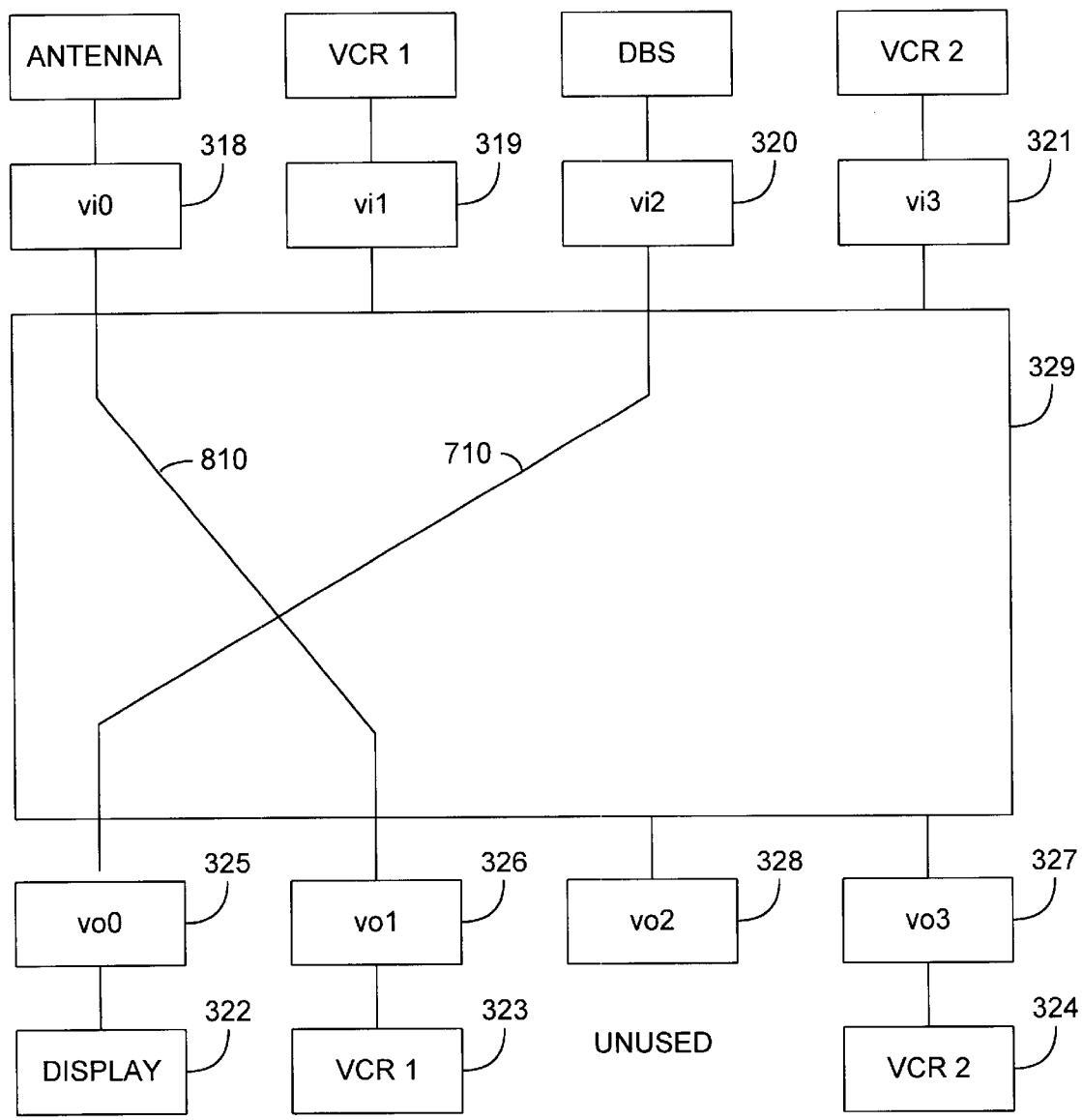
FIG. 8 is a diagram in which the first connection through an audio/video multiplexer has been rerouted to resolve a conflict.

Now turning to FIG. 8, if the user selects a program or event that is available on video input vi0 and which is not the current program also being recorded, a conflict arises. The audio/video multiplexer cannot re-tune the video input vi0, 318 without affecting the recording of the current program to video output or vo1 326. The TV services component 201 determines that there is a conflict condition and then searches the content services component 203 and specifically the EPG database 205 for an alternative source of programming signals from another programming receiver. When an alternative source of programming and a connection is available between the associated video input and the video output, a new connection is formed in the system audio/video multiplexer 329. In the example shown in FIG. 8, the selected program that the user wants to display on the monitor 322 would be available on the receiver connected to vi2, 321 a new connection 810 is formed between vi2, 320 and vo0, 325, and once the new connection 810 is made, the TV state database 213 is updated with an entry that includes a video input of vi2 and a video output of vo0. After updating the connections in the TV state database, the TV services component 201 awaits the next potential conflict.

In some instances, it is impossible to come up with a conflict resolution that provides a currently available connection through the system audio/video multiplexer 329. In this instance, the television services component searches the content services component 203 and specifically the EPG database 205 for a selected program that is being re-broadcast or is available at an alternative start time, which is beyond the time needed to watch or record the current event. The TV services component 201 checks the channel map services component 202, and specifically the channel map database 204, to determine if one of the receivers of programs will receive the event at the later time found in the electronic program guide database 205. If the later event is available on one of the receivers, after checking the EPG database 205 and the channel map database 204, the TV services component 201 notifies the user of the conflict and identifies an alternate start time for either the event to record or the event in conflict. In one embodiment, the user is asked to resolve the conflict. In another embodiment, a default condition or user preference can be stored within the system. The default or condition is a rule applied by the system for resolving the conflict. The default or conflict condition may be selected by the system automatically or after a desired delay where the user is given a chance to select but has not acted. After the user identifies which alternative is desirable, the TV services component 201 makes a connection between the appropriate video input and the appropriate video output through the system audio/video multiplexer 329 and also records it at the later time. The second option for recording or viewing at the delayed time is also recorded. At the later time, the TV services component 201 implements the desired connection to produce the time-delayed broadcast or recording. Many times, a delayed broadcast for another time zone will provide the desired solution.

The TV services component 201 initially determines the presence of a conflict condition at a first time where there are multiple requests for a first programming signal and a second programming signal from a first programming receiver. The conflicts can not be resolved in real time by changing connection paths through the audio/video multiplexer 329. The TV services component then searches for an alternative source of programming signals from a second programming receiver. Once an alternative source of programming signals is found, the TV state database 213 is searched to determine if the connection is available at the delayed time (delayed start time to the delayed stop time). The entries 335 and 336 (shown in FIG. 3, are checked for the start and stop times). Similarly, the entries 445, 446, 447, and 448 are searched to determine if there are time conflicts with a specific device. If no conflicts are found, the later source of programming is listed as an option. Of course, there may be many sources of the same programming event. Each programming event is checked in a similar manner and the available options are listed for the user's selection. The user is given notice that the current request can not be accommodated and is also presented with a list of options, one of which may be selected. If the user selects an option, the selected option is recorded in memory. The TV services component 201 then implements the solution at the selected time and makes the connection through the audio/video multiplexer 329 at the appointed time. This resolves the conflict.

In one embodiment it may be advantageous to store all the unselected options in the case where another current conflict has solutions which conflict with other time-shifted solutions. In another embodiment, the above process is repeated since there may be event changes in the content services component 203 of the convergence system. In still another embodiment, the EPG database 205 of the content services component 203 is searched periodically to assure that there have been no changes in the times of the events from those recorded in memory as time-shifted solutions for conflicts.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computerized convergence system comprising:
   a system audio/video multiplexer;
   a plurality of programming receivers communicatively coupled to inputs of said system audio/video multiplexer, said plurality of programming receivers each producing one or more programming signals;
   a plurality of outputs communicatively coupled to said system audio/video multiplexer;
   a multiplexer controller communicatively coupled to said system audio/video multiplexer, said multiplexer controller controlling the connections of each one of the programming receivers to each one of the plurality of outputs;
   a TV services component interfacing with the multiplexer controller, said TV services component determining the programming signals associated with each of said programming receivers and controlling said multiplexer controller to connect selected programming signals to the outputs communicatively coupled to the system audio/video multiplexer, at a first time and at a second time.

2. The computerized system of claim 1 wherein the TV services component controls the multiplexer controller to connect selected programming signals to the outputs based on the time and on availability of the selected programing signals to the programming receiver and based on the availability of the hardware communicatively coupled to the output.

3. The computerized system of claim 2, wherein said TV services component is communicatively coupled to a state database, said state database including information regarding which program sources are selected into the various outputs at the first time and at the second time.

4. The computerized system of claim 1 further comprising:
   a state database for determining which program sources are selected into the various outputs,
   a channel map database which assigns logical channel numbers to a channel of a program receiver and a source of programming,
   a content services component for determining the availability of selected programming signals to one or more programming receivers, wherein said TV services component is communicatively coupled to the state database, the channel map database, and the content services component, said TV services component
      determining a conflict condition where there are requests for two programming signals from a first programming receiver;
      searching the content services component for an alternative source of programming signals from a second programming receiver at a second time; and
      connecting the second programming receiver to the selected output by changing the state database to reflect the second time.

5. A method for controlling a convergence system having a first receiver and a second receiver communicatively coupled to a multiplexer and inputting program signals to said multiplexer, and having a plurality of devices communicatively coupled to said multiplexer, the outputs of said multiplexer inputting programming signals to said devices, said method comprising the steps of:
   determining a conflict condition at a first time where there are requests for a first programming signal and a second programming signal from a first programming receiver;
   searching for an alternative source of programming signals from a second programming receiver, said alternative source of programming signals occurring at a second time; and
   connecting the second programming receiver to the selected device at the second time to resolve the conflict.

6. The method of claim 5, wherein the step of searching for an alternative source of programming signals further comprises the step of searching for additional sources of the first programming signal and the second programming signal using an electronic program guide.

7. The method of claim 6, wherein the step of searching for an alternative source of programming signals further comprises the step of determining if the receivers attached to the multiplexer correspond to the additional sources of the first programming signal and the second programming signal.

8. The method of claim 5, wherein the step of searching for an alternative source of programming signals further comprises the steps of:

determining the additional receivers attached to the multiplexer; and searching the additional receivers for the first programming signal and the second programming signal using an electronic program guide.

9. The method of claim 8, wherein the step of connecting the second programming receiver to the selected device to resolve the conflict is done under software control of the multiplexer.

10. The method of claim 5, further comprising the step of assuring that the input source of programming and the connection to the output is available at the delayed time.

11. The method of claim 10, further comprising the step of replacing the start time of associated time-shifted program from a first time to a second time.

12. The method of claim 10, further comprising the step of updating the source and the channel of the source to the alternate source of the time-shifted program.

13. The method of claim 5, further comprising the step of informing the user of the conflict and a solution that includes time-shifting a program from a first time to a second time.

14. A computerized convergence system comprising:

a hardware component providing a convergence environment;

a channel map services component providing a listing of receivers of programming associated with the convergence environment and a listing of channels associated with the receivers;

an content services component further comprising:
   a listing of programming events;
   a listing of times associated with programming events; and
   a listing of programming sources and associated channels; and, a TV services component communicatively coupled to the channel map services component, and the content services component, and interfacing with the hardware component of the convergence environment to manage the hardware component of the convergence environment, said TV services component shifting the start times of programming events.

15. The computerized system of claim 14, wherein the TV services component further comprises a TV state database that associates the inputs of the hardware component to the outputs of the hardware component at a first time and at a second time.

16. The computerized system of claim 14, wherein the TV services component further comprises a database which associates start times for various programming events to inputs of the hardware component and to the outputs of the hardware component.

17. The computerized system of claim 14, further comprising an application programming interface, wherein the application programming interface is communicatively coupled to the television services component.

* * * * *